United States Patent
Briesch et al.

(10) Patent No.: US 10,316,700 B2
(45) Date of Patent: Jun. 11, 2019

(54) COMBINED CYCLE POWER PLANT HAVING SUPERCRITICAL STEAM TURBINE

(71) Applicant: Siemens Aktiengesellschaft, München (DE)

(72) Inventors: Michael S. Briesch, Orlando, FL (US); Ankur Deshmukh, Oviedo, FL (US); Thorsten Wolf, Orlando, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/549,555

(22) PCT Filed: Jan. 25, 2016

(86) PCT No.: PCT/US2016/014675
§ 371 (c)(1),
(2) Date: Aug. 8, 2017

(87) PCT Pub. No.: WO2016/137620
PCT Pub. Date: Sep. 1, 2016

(65) Prior Publication Data
US 2018/0051596 A1 Feb. 22, 2018

Related U.S. Application Data

(60) Provisional application No. 62/119,886, filed on Feb. 24, 2015.

(51) Int. Cl.
*F01K 3/26* (2006.01)
*F01K 7/18* (2006.01)
(Continued)

(52) U.S. Cl.
CPC .............. *F01K 23/106* (2013.01); *F01K 3/26* (2013.01); *F01K 7/18* (2013.01); *F01K 7/22* (2013.01);
(Continued)

(58) Field of Classification Search
CPC ................... Y02E 20/16; F01K 23/06; F01K 23/10–23/108
(Continued)

(56) References Cited

U.S. PATENT DOCUMENTS 3,683,621 A    8/1972  Szewalski
4,702,081 A *  10/1987 Vinko ..................... F01K 23/06
                                                              60/655

(Continued)

FOREIGN PATENT DOCUMENTS

DE    102013225543 B3 *  2/2015  ............... F01K 1/08
GB    575812 A             3/1946
WO    2010034659 A2        4/2010

OTHER PUBLICATIONS

PCT International Search Report and Written Opinion dated Apr. 25, 2016 corresponding to PCT Application No. PCT/US2016/014675 filed Jan. 25, 2016.

*Primary Examiner* — Mark A Laurenzi
*Assistant Examiner* — Mickey H France

(57) ABSTRACT

A combine cycle power plant is presented. The combine cycle power plant includes a gas turbine, a heat recovery steam generator, a main steam turbine and a supercritical steam turbine. The supercritical steam turbine may be operated as a separate steam turbine that may be not a single steam turboset with the main steam turbine. The supercritical steam turbine receives supercritical steam generated in the heat recovery steam generator to produce power output.

(Continued)

Exiting steam from the supercritical steam turbine may be routed to the main steam turbine. The supercritical steam turbine may be operated at a rotational speed that is higher than a grid frequency. The rotational speed of the supercritical steam turbine may be reduced to the grid frequency via a gearbox.

18 Claims, 7 Drawing Sheets

(51) Int. Cl.
    *F01K 7/22*     (2006.01)
    *F01K 7/32*     (2006.01)
    *F01K 23/10*     (2006.01)

(52) U.S. Cl.
    CPC ............. *F01K 7/32* (2013.01); *F01K 23/10* (2013.01); *F01K 23/101* (2013.01); *Y02E 20/16* (2013.01)

(58) Field of Classification Search
    USPC ........................................ 60/39.182
    See application file for complete search history.

(56) References Cited

U.S. PATENT DOCUMENTS

| | | | |
|---|---|---|---|
| 6,230,480 B1* | 5/2001 | Rollins, III | F01K 23/105 122/7 B |
| 6,606,848 B1 | 8/2003 | Rollins, III | |
| 6,820,428 B2 | 11/2004 | Wylie | |
| 2004/0104017 A1* | 6/2004 | Franke | F01K 23/106 165/157 |
| 2004/0139747 A1* | 7/2004 | Erickson | F01K 23/04 60/772 |
| 2009/0090111 A1 | 4/2009 | Tomlinson et al. | |
| 2009/0229267 A1* | 9/2009 | Wieghardt | F01K 7/16 60/684 |
| 2011/0018265 A1* | 1/2011 | Hoffmann | F01K 13/02 290/7 |
| 2011/0302921 A1* | 12/2011 | Ferguson | F02C 1/007 60/641.8 |
| 2012/0227372 A1* | 9/2012 | Li | F01K 7/38 60/39.182 |
| 2013/0180228 A1* | 7/2013 | Zhang | F01K 7/22 60/39.182 |
| 2014/0216035 A1 | 8/2014 | Bierewirtz et al. | |
| 2015/0052906 A1* | 2/2015 | Kehmna | F01K 7/22 60/783 |
| 2016/0123183 A1* | 5/2016 | Bennauer | F01D 21/20 60/779 |
| 2016/0290170 A1* | 10/2016 | Franck | F01K 1/08 |
| 2018/0051596 A1* | 2/2018 | Briesch | F01K 3/26 |

* cited by examiner

COMBINED CYCLE POWER PLANT HAVING SUPERCRITICAL STEAM TURBINE

CROSS REFERENCE TO RELATED APPLICATIONS

This application claims priority to U.S. provisional application 62/119,886 filed on Feb. 24, 2015, the entire content of which is hereby incorporated by reference.

FIELD

Aspects of the present invention relate to a combined cycle power plant and method for operating a combined cycle power plant, and in particular a combined cycle power plant having a supercritical steam turbine.

DESCRIPTION OF RELATED ART

A combined cycle power plant may include a gas turbine that generates power output from combustion of a fuel and air mixture. A heat recovery steam generator may be located downstream from the gas turbines to receive exhaust gas from the gas turbines. The heat recovery steam generator extracts energy from the exhaust gas to produce superheated steam. The superheated steam may be transferred to a steam turbine for generating additional power output. A steam turbine may include multiple pressure steam sections such as a high pressure steam section, an intermediate pressure steam section, and one or more low pressure steam section.

The combined cycle power plant may be in a single-shaft application. A single-shaft application may include one generator that is connected to the gas turbine and the steam turbine. The combined cycle power plant may be in a multiple-shaft application. A multiple-shaft application may include multiple generators. Each of the multiple generators may be connected to the gas turbine and the steam turbine separately.

To improve performance of a combined cycle power plant, it would be desirable to increase steam pressure and steam temperature prior to transferring the steam to the steam turbine. This may result in a steam having a pressure which is above a critical pressure of water and having a temperature which is above a critical temperature of water. The critical pressure of water is about 3206.2 psi. The critical temperature of water is about 705.4 F. A steam having parameters above the critical parameters of water is referred as a supercritical steam.

A steam turbine may be operated as one turboset including a supercritical section, a high pressure section, an intermediate pressure, and low pressure sections. Different pressure sections of the one turboset may be operated at the same speed at grid frequency. This may decrease plant efficiency improvement due to effects of the supercritical steam. For example, high pressure of the supercritical steam may increase shaft seal leakage losses. High pressure of the supercritical steam may reduce flow volume resulting in low turbine efficiency. Such effects may annihilate theoretical improvement of power plant efficiency due to supercritical steam parameters.

SUMMARY

Briefly described, aspects of the present invention relate to a combined cycle power plant and method for operating a combined cycle power plant, and in particular a combined cycle power plant comprising a supercritical steam turbine.

According to an aspect, a combined cycle power plant is presented. The combined cycle power plant comprises a gas turbine that is configured to generate power output. The combined cycle power plant comprises a heat recovery steam generator located downstream of the gas turbines that is configured to receive exhaust gas from the gas turbine and produce steam by extracting energy from the exhaust gas. The combined cycle power plant comprises a main steam turbine that is configured to generate power output. The combined cycle power plant comprises a supercritical steam turbine that is configured to generate power output. The heat recovery steam generator comprises multiple pressure steam systems comprising a low pressure steam system, an intermediate pressure steam system, and a high pressure steam system. The low pressure steam system is configured to generate low pressure steam. The intermediate pressure steam system is configured to generate intermediate pressure steam. The high pressure steam system is configured to generate supercritical steam. The supercritical steam is transferred to the supercritical steam turbine. The supercritical steam turbine is configured to expand the supercritical steam to generate power output and produce exiting steam. The main steam turbine is configured to generate power output from the exiting steam from the supercritical steam turbine, the intermediate pressure steam generated in the heat recovery steam generator, and the low pressure steam generated in the heat recovery steam generator.

According to an aspect, a method for operating a combined cycle power plant is presented. The combined cycle power plant comprises a gas turbine, a heat recovery steam generator located downstream of the gas turbine, a main steam turbine, and a supercritical steam turbine. The heat recovery steam generator comprises multiple pressure steam systems comprising a low pressure steam system, an intermediate pressure steam system, and a high pressure steam system. The method comprises operating the gas turbine to generate power output. The method comprises generating low pressure steam in the low pressure steam system of the heat recovery steam generator by extracting energy from exhaust gas of the gas turbine. The method comprises generating intermediate pressure steam in the intermediate pressure steam system of the heat recovery steam generator by extracting energy from the exhaust gas of the gas turbine. The method comprises generating supercritical steam in the high pressure steam system of the heat recovery steam generator by extracting energy from the exhaust gas of the gas turbine. The method comprises transferring the supercritical steam to the supercritical steam turbine. The method comprises operating the supercritical steam turbine to generate power output by expanding the supercritical steam and producing exiting steam. The method comprises operating the main steam turbine to generate power output from the exiting steam from the supercritical steam turbine, the intermediate pressure steam generated in the heat recovery steam generator, and the low pressure steam generated in the heat recovery steam generator.

According to an aspect, a combined cycle power plant is presented. The combined cycle power plant comprises a gas turbine that is configured to generate power output. The combined cycle power plant comprises a heat recovery steam generator located downstream of the gas turbines that is configured to receive exhaust gas from the gas turbine and produce steam by extracting energy from the exhaust gas. The combined cycle power plant comprises a main steam turbine that is configured to generate power output. The combined cycle power plant comprises a supercritical steam turbine that is configured to generate power output. The supercritical steam turbine is configured to be operated at a rotational speed that is higher than a grid frequency. The combined cycle power plant comprises a gearbox connected to the supercritical steam turbine. The gearbox is configured to reduce the rotational speed of the supercritical steam turbine to the grid frequency The heat recovery steam generator comprises multiple pressure steam systems comprising a low pressure steam system, an intermediate pressure steam system, and a high pressure steam system. The low pressure steam system is configured to generate low pressure steam. The intermediate pressure steam system is configured to generate intermediate pressure steam. The high pressure steam system is configured to generate supercritical steam. The supercritical steam is transferred to the supercritical steam turbine. The supercritical steam turbine is configured to expand the supercritical steam to generate power output and produce exiting steam. The main steam turbine is configured to generate power output from the exiting steam from the supercritical steam turbine, the intermediate pressure steam generated in the heat recovery steam generator, and the low pressure steam generated in the heat recovery steam generator.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
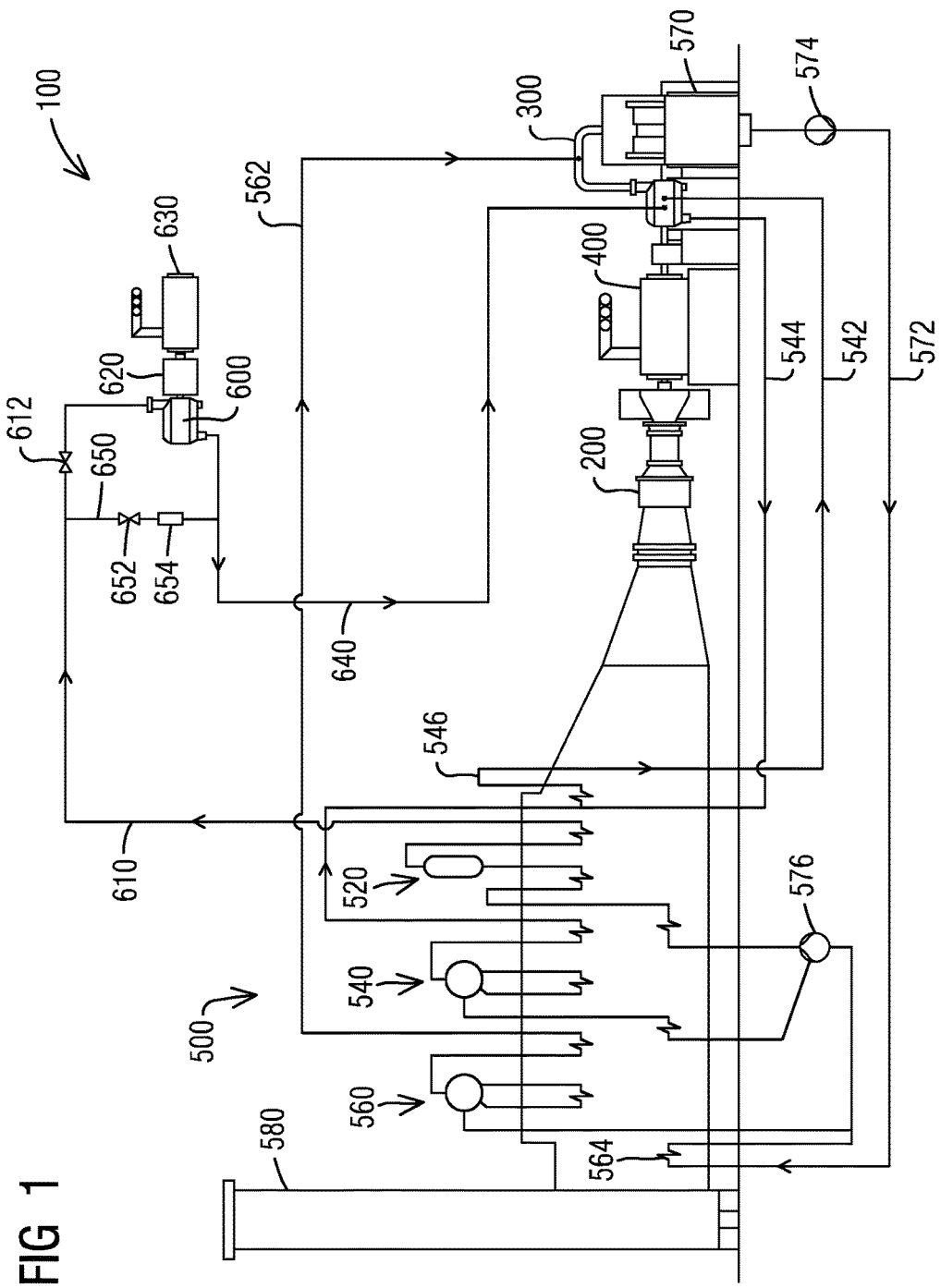
FIG. 1 illustrates a schematic flow diagram of a combined cycle power plant having a supercritical steam turbine according to an embodiment wherein a supercritical steam turbine is connected to a supercritical steam turbine generator.

FIG. 1 illustrates a schematic flow diagram of a combined cycle power plant 100 having a supercritical steam turbine 600 according to an embodiment. In the example illustrated embodiment, the combined cycle power plant 100 comprises a gas turbine 200. The gas turbine 200 may generate power output from combustion of a fuel and air mixture. The power plant 100 comprises a heat recovery steam generator (HRSG) 500 located downstream of the gas turbine 200. Exhaust gas from the gas turbine 200 may flow through the HRSG 500 to produce steam. The exhaust gas may exit the HRSG 500 through an exhaust stack 580. According to the example illustrated embodiment, the power plant 100 comprises a main steam turbine 300. The main steam turbine 300 may receive steam generated in the HRSG 500 to produce power output.

A combined cycle power plant 100 may be in a single shaft configuration, or in a multi-shaft configuration. The combined cycle power plant 100 illustrated in FIG. 1 is in a single shaft configuration, where the gas turbine 200 and the main steam turbine 300 are connected to a common generator 400. In a multi-shaft configuration, a gas turbine 200 and a main steam turbine 300 may be connected to separate generators.

According to an embodiment, a HRSG 500 may comprise multiple pressure steam systems. In the example embodiment illustrated in FIG. 1, the HRSG 500 comprises three pressure steam systems including a high pressure (HP) steam system 520, an intermediate pressure (IP) steam system 540, and a low pressure (LP) steam system 560. According to an embodiment, a main steam turbine 300 may include multiple pressure steam turbine sections, for example, a LP steam turbine section, an IP steam turbine section, and a HP steam turbine section. In the illustrated embodiment of FIG. 1, a LP steam turbine section of the main steam turbine 300 may receive LP steam generated in the HRSG 500 via a LP steam line 562. Exhaust from the LP steam turbine section of the main steam turbine 300 may enter into a condenser 570. Condensate may be fed from the condenser 570 to the HRSG 500 via a condensate line 572 with an aid of a condensate extraction pump 574. The condensate may pass through LP steam system 560 to generate LP steam. The LP steam may be fed back to the LP steam turbine section of the main steam turbine 300 via the LP steam line 562. The LP steam system 560 comprises a condensate preheater 564. The condensate after passing through the condensate preheater 564 may be fed to the HP steam system 520 and the IP steam system 540 with an aid of a boiler feed pump 576. The IP steam system 540 may generate IP steam. Exhaust of the HP steam turbine section of the main steam turbine 300 may be fed back to a reheater 546 via a cold reheat line 544. The reheated steam may be mixed with the IP steam generated in the IP steam system 540 and transferred to the main steam turbine 300 via an IP steam line 542.

According to an embodiment illustrated in FIG. 1, the combined cycle power plant 100 may include a supercritical steam turbine 600. According to the embodiment, the HP steam system 520 of the HRSG 500 may generate supercritical steam. A supercritical steam may have a steam pressure that is above a critical pressure of water. The critical pressure of water is about 3206.2 psi. A supercritical steam may have a steam temperature that is above a critical temperature of water. The critical temperature of water is about 705.4 F. The supercritical steam generated in the HRSG 500 may be fed to the supercritical steam turbine 600 via a supercritical steam line 610. The supercritical steam line comprises a supercritical steam flow control valve 612. The supercritical steam flow control valve 612 may control a flow of the supercritical steam to the supercritical steam turbine 600. The supercritical steam may be expanded in the supercritical steam turbine 600 and exit from the supercritical steam turbine 600 as an exiting steam. Steam parameters of the exiting steam from the supercritical steam turbine 600 may be reduced below critical parameters. A pressure of the exiting steam from the supercritical steam turbine 600 may be suitable to a HP steam turbine section of the main steam turbine 300. The exiting steam may be fed to the HP steam turbine section of the main steam turbine 300 via an exiting line 640. According to an embodiment, the main steam turbine 300 may generate power output from the exiting steam from the supercritical steam turbine 600, the IP steam generated in the HRSG 500, and the LP steam generated in the HRSG 500.

According to an embodiment illustrated in FIG. 1, the power plant 100 comprises a supercritical steam bypass line 650. The supercritical steam generated in the HRSG 500 may be bypassed through the supercritical steam bypass line 650 during the power plant 100 startup or when the supercritical steam turbine 600 is unavailable. A supercritical steam bypass valve 652 may be arranged in the supercritical steam bypass line 650. During a supercritical steam bypass process, the supercritical steam flow control valve 612 may be closed to prevent the supercritical steam flowing into the supercritical steam turbine 600. The supercritical steam bypass valve 652 is open to allow the supercritical steam bypassing through the supercritical steam bypass line 650. The supercritical steam bypass valve 652 may expand the supercritical steam. A pressure of the expanded steam may be suitable to a HP steam turbine section of the main steam turbine 300. According to an embodiment, a water injection device 654 may be arranged in the supercritical steam bypass line 650 downstream of the supercritical steam bypass valve 652. The water injection device 654 may inject water to the expanded steam to reduce a temperature of the expanded steam below a critical temperature of water. Exiting steam after passing through the supercritical steam bypass line 650 may be transferred to a HP steam turbine section of the main steam turbine 300 via the exiting line 640.

According to an embodiment illustrated in FIG. 1, the supercritical steam turbine 600 may be arranged as a separate steam turbine that may be not a single steam turboset with the main steam turbine 300. The illustrated embodiment may allow the supercritical steam turbine 600 to be operated at a rotational speed that equals to a grid frequency, or at a rotational speed that does not equal to a grid frequency. The supercritical steam turbine 600 may be operated at a rotational speed that is higher than a grid frequency. According to an embodiment, the supercritical steam turbine 600 may be operated at a rotational speed that is much higher than a grid frequency. For example, the supercritical steam turbine 600 may be operated at a rotational speed that is at least 1.5 times higher than a grid frequency, or at least twice higher than a grid frequency, or at least three times higher than a grid frequency, or a rotational speed that may optimize power plant efficiency improvement with supercritical steam parameters. According to an embodiment, the supercritical steam turbine 600 may be designed with a small shaft diameter due to a high rotational speed. Small shaft diameter may reduce shaft leakage area. Small shaft diameter may increase blade length of the supercritical steam turbine 600. Increased turbine blade length may increase efficiency of the supercritical steam turbine 600.

According to an embodiment illustrated in FIG. 1, the supercritical steam turbine 600 may be connected to a gearbox 620. The gearbox 620 may reduce a rotational speed of the supercritical steam turbine 600 that is higher than a grid frequency to the grid frequency. According to the example embodiment illustrated in FIG. 1, the combined cycle power plant may include a supercritical steam turbine generator 630. The supercritical steam turbine 600 may be connected to the supercritical steam turbine generator 630 via the gearbox 620 to generate power output after reducing the rotational speed to the grid frequency. According to an embodiment, the supercritical steam turbine generator 630 may be arranged at a location for easy installation. According to an embodiment, the supercritical steam turbine 600 may be arranged at a location that is close to a HRSG 500 to reduce high energy piping length.

Figure 2:
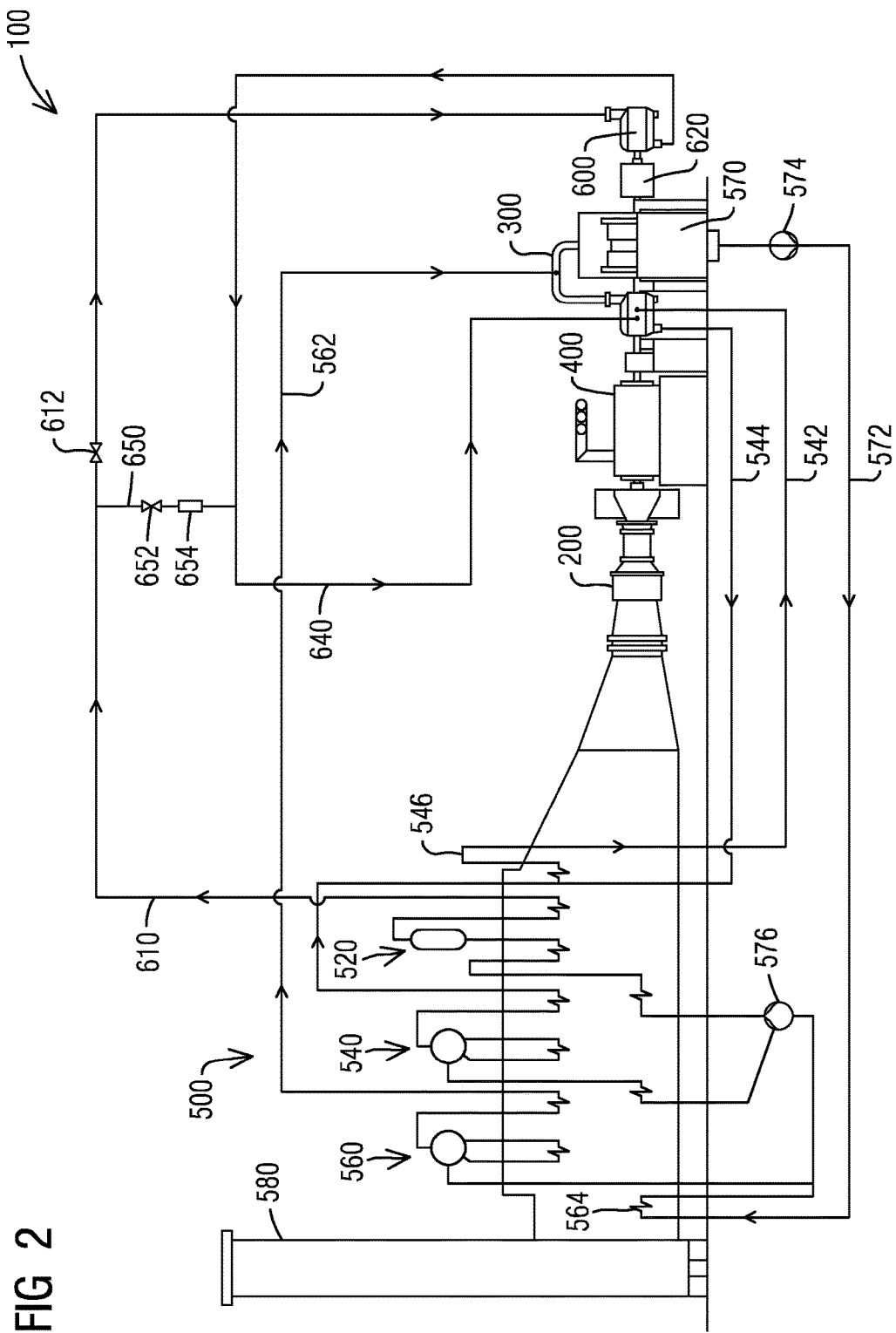
FIG. 2 illustrates a schematic flow diagram of a combined cycle power plant having a supercritical steam turbine according to an embodiment wherein a supercritical steam turbine is connected to a main steam turbine.

FIG. 2 illustrates a schematic diagram of a combined cycle power plant 100 having a supercritical steam turbine 600 according to an embodiment. In this embodiment, the supercritical steam turbine 600 may be operated at a rotational speed that is higher than a grid frequency. A gearbox 620 may be connected to the supercritical steam turbine 600. The gearbox 620 may reduce the rotational speed of the supercritical steam turbine 600 to the grid frequency. According to the example embodiment as illustrated in FIG. 2, the supercritical steam turbine 600 may be connected to a main steam turbine 300 via the gearbox 620 after reducing the rotational speed to the grid frequency. According to the example embodiment as illustrated in FIG. 2, the supercritical steam turbine 600 may not require a separate generator. The embodiment of FIG. 2 otherwise corresponds to the embodiment of FIG. 1. Corresponding parts of FIG. 2 are correspondingly numbered, but are not described again with reference to FIG. 2.

Figure 3:
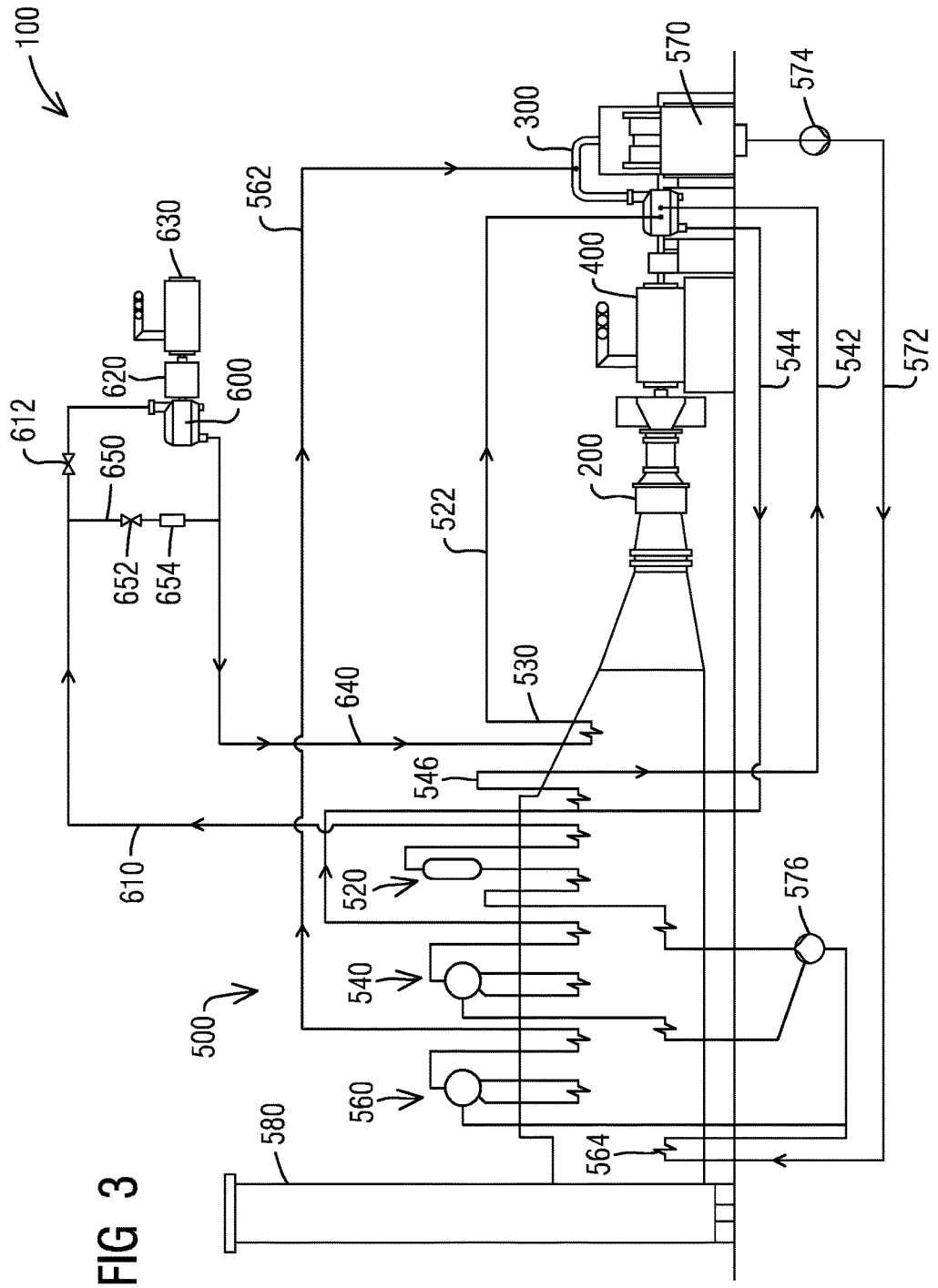
FIG. 3 illustrates a schematic flow diagram of a combined cycle power plant having a supercritical steam turbine according to an embodiment wherein exiting steam of a supercritical steam turbine is reheated in a HRSG prior to be transferred to a main steam turbine.

FIG. 3 illustrates a schematic diagram of a combined cycle power plant 100 having a supercritical steam turbine 600 according to an embodiment. In this embodiment, a HRSG 500 may include an additional reheater 530. Exiting steam from the supercritical steam turbine 600 may be routed to the additional reheater 530 via an exiting line 640. According to the embodiment, the exiting steam of the supercritical steam turbine 600 may be reheated in the additional reheater 530 to increase temperature of the exiting steam. The reheated exiting steam of the supercritical steam turbine 600 may be transferred to a main steam turbine 300 via a HP steam line 522. The illustrated example embodiment of FIG. 3 may increase efficiency of the main steam turbine 300. The embodiment of FIG. 3 otherwise corresponds to the embodiment of FIG. 1. Corresponding parts of FIG. 3 are correspondingly numbered, but are not described again with reference to FIG. 3.

Figure 4:
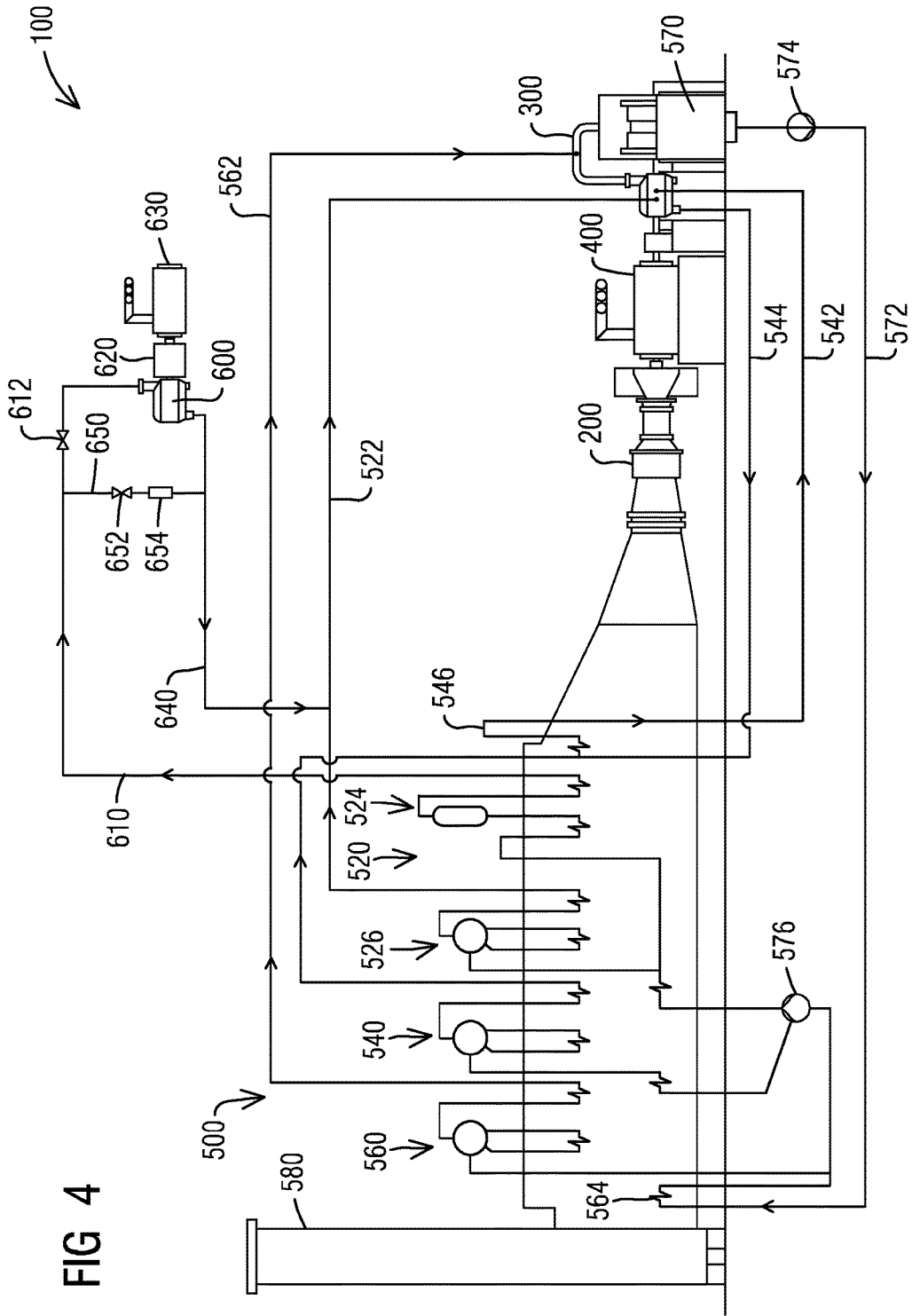
FIG. 4 illustrates a schematic flow diagram of a combined cycle power plant having a supercritical steam turbine according to an embodiment wherein exiting steam of a supercritical steam turbine is mixed with subcritical HP steam generated in a HRSG and the HP steam mixture is transferred to a main steam turbine.

FIG. 4 illustrates a schematic flow diagram of a combined cycle power plant 100 having a supercritical steam turbine 600 according to an alternative embodiment. In this embodiment, a HP steam system 520 of a HRSG 500 comprises a supercritical HP steam system 524 that may generate supercritical steam. The HP steam system 520 further comprises a subcritical HP steam system 526 that may generate subcritical HP steam. The supercritical steam may be fed to a supercritical steam turbine 600 via a supercritical steam line 610. According to the illustrated example embodiment, exiting steam from the supercritical steam turbine 600 may be mixed with the subcritical HP steam via an exiting line 640 to generate a HP steam mixture. The HP steam mixture may be fed to the main steam turbine 300 via a HP steam line 522. The embodiment of FIG. 4 otherwise corresponds to the embodiment of FIG. 1. Corresponding parts of FIG. 4 are correspondingly numbered, but are not described again with reference to FIG. 4.

Figure 5:
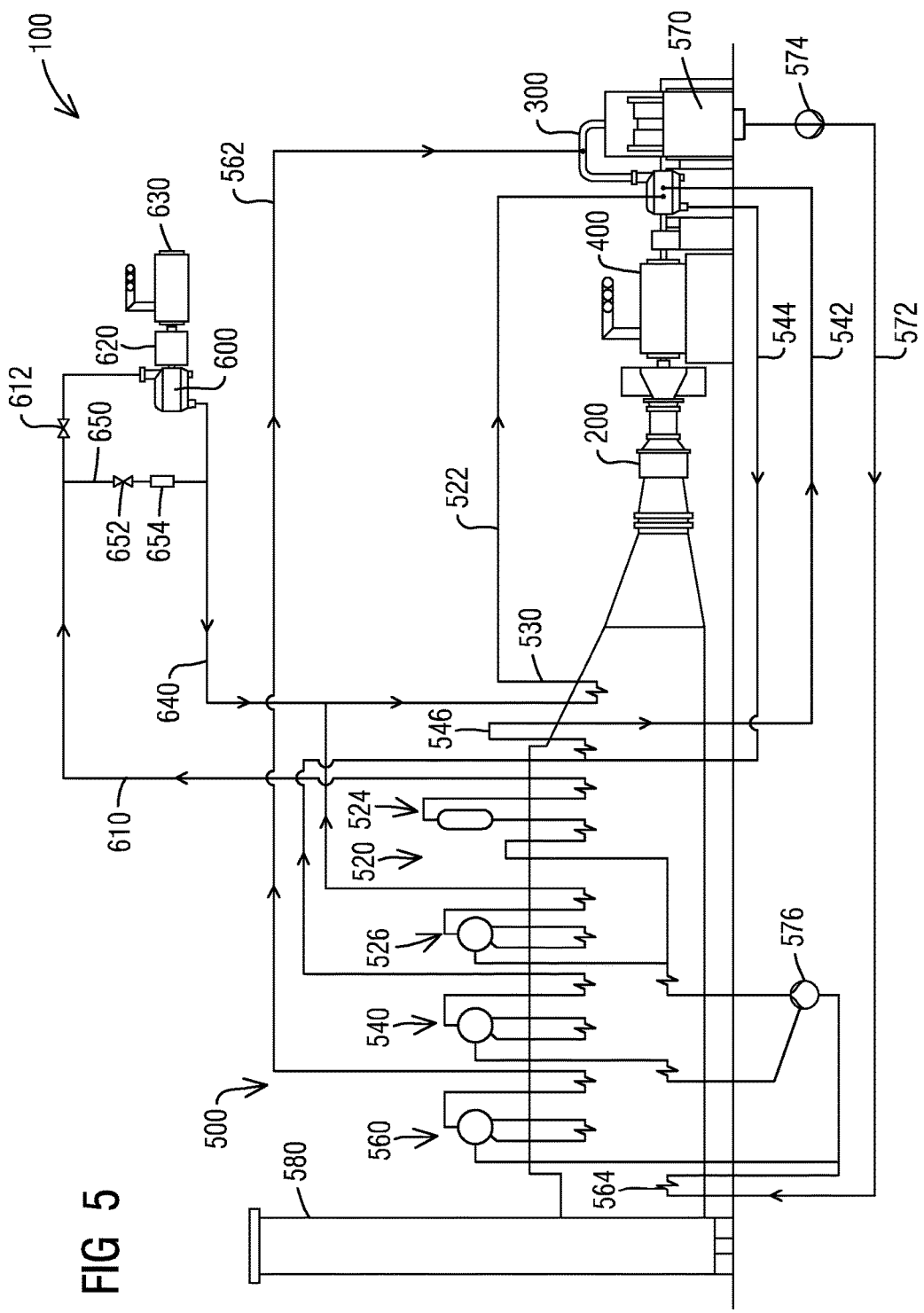
FIG. 5 illustrates a schematic flow diagram of a combined cycle power plant having a supercritical steam turbine according to an embodiment wherein exiting steam of a supercritical steam turbine is mixed with subcritical HP steam generated in a HRSG and the HP steam mixture is reheated prior to be transferred to a main steam turbine.

FIG. 5 illustrates a schematic flow diagram of a combined cycle power plant 100 having a supercritical steam turbine 600 according to an embodiment. In this embodiment, a HRSG 500 may include an additional reheater 530. According to the illustrated example embodiment, a HP steam system 520 of a HRSG 500 comprises a supercritical HP steam system 524 that may generate supercritical steam. The HP steam system 520 further comprises a subcritical HP steam system 526 that may generate subcritical HP steam. The supercritical steam generated by the supercritical HP steam system 524 may be fed to a supercritical steam turbine 600 via a supercritical steam line 610. According to the illustrated example embodiment, exiting steam from the supercritical steam turbine 600 may be mixed with the subcritical HP steam via an exiting line 640 to generate a HP steam mixture. The HP steam mixture may be reheated in the additional reheater 530 to increase temperature of the HP steam mixture. The reheated HP steam mixture may be transferred to a main steam turbine 300 via a HP steam line 522. The embodiment of FIG. 5 otherwise corresponds to the embodiment of FIG. 4. Corresponding parts of FIG. 5 are correspondingly numbered, but are not described again with reference to FIG. 5.

A combined cycle power plant 100 may be in a single shaft configuration, or in a multi-shaft configuration. The illustrated example embodiments of a combined cycle power plant 100 in FIG. 1 to FIG. 5 are in a single shaft configuration. Similar embodiments may be implemented in a multi-shaft configuration, where a main steam turbine 300 and a gas turbine 200 may be connected to separate generators.

Figure 6:
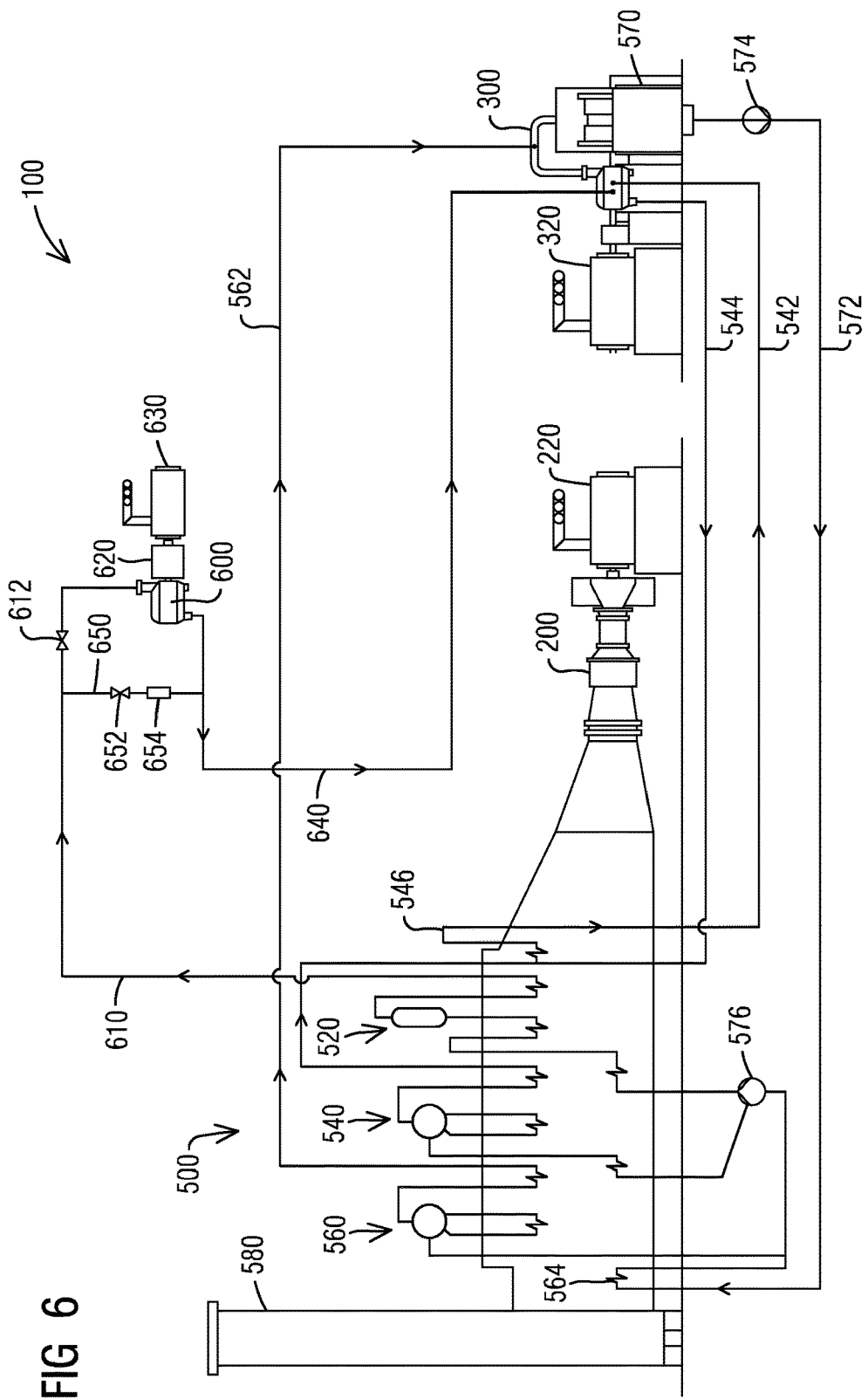
FIG. 6 illustrates a schematic flow diagram of a multi-shaft combined cycle power plant having a supercritical steam turbine according to an embodiment wherein a supercritical steam turbine is connected to a supercritical steam turbine generator.

FIG. 6 illustrates a schematic flow diagram of a multi-shaft combined cycle power plant 100 having a supercritical steam turbine 600 according to an embodiment. In this embodiment, a gas turbine 200 may be connected to a gas turbine generator 220. A main steam turbine 300 may be connected to a main steam turbine generator 320. According to an embodiment, a supercritical steam turbine 600 may be operated at a rotational speed that is higher than a grid frequency. In the illustrated example embodiment of FIG. 6, the supercritical steam turbine 600 may be connected to a gearbox 620. The gearbox 620 may reduce a rotational speed of the supercritical steam turbine 600 that is higher than a grid frequency to the grid frequency. According to the example embodiment illustrated in FIG. 6, the combined cycle power plant may include a supercritical steam turbine generator 630. The supercritical steam turbine 600 may be connected to the supercritical steam turbine generator 630 via the gearbox 620 to generate power output after reducing the rotational speed to the grid frequency. According to an embodiment, the supercritical steam turbine generator 630 may be arranged at a location for easy installation. According to an embodiment, the supercritical steam turbine 600 may be arranged at a location that is close to a HRSG 500 to reduce high energy piping length. The embodiment of FIG. 6 otherwise corresponds to the embodiment of FIG. 1. Corresponding parts of FIG. 6 are correspondingly numbered, but are not described again with reference to FIG. 6.

Figure 7:
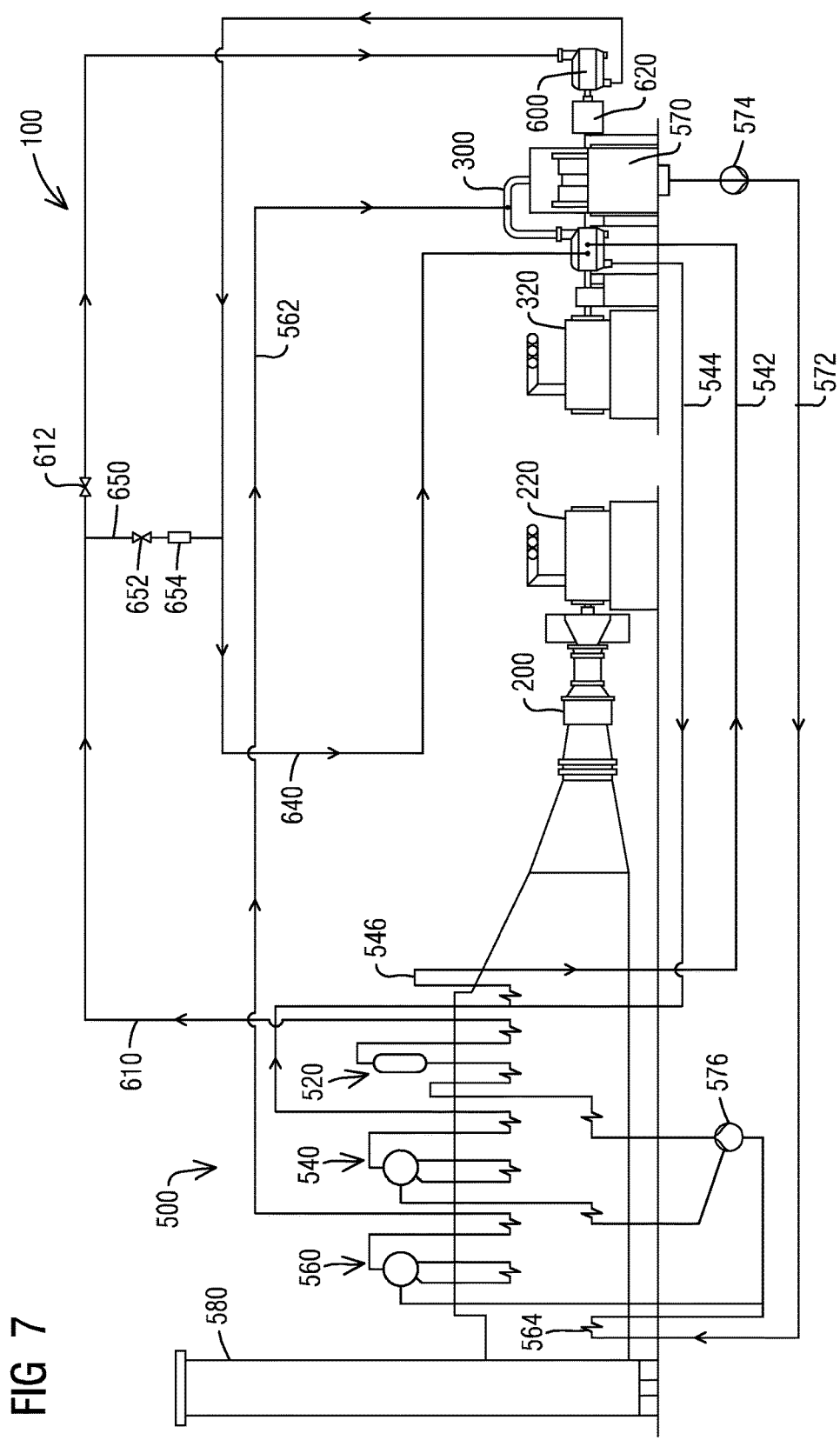
FIG. 7 illustrates a schematic flow diagram of a multi-shaft combined cycle power plant having a supercritical steam turbine according to an embodiment wherein a supercritical steam turbine is connected to a main steam turbine.

FIG. 7 illustrates a schematic flow diagram of a multi-shaft combined cycle power plant 100 having a supercritical steam turbine 600 according to an embodiment. In this embodiment, a gas turbine 200 may be connected to a gas turbine generator 220. A main steam turbine 300 may be connected to a main steam turbine generator 320. According to an embodiment, a supercritical steam turbine 600 may be operated at a rotational speed that is higher than a grid frequency. In the illustrated example embodiment of FIG. 7, the supercritical steam turbine 600 may be connected to a gearbox 620. The gearbox 620 may reduce the rotational speed of the supercritical steam turbine 600 that is higher than a grid frequency to the grid frequency. According to the example embodiment illustrated in FIG. 7, the supercritical steam turbine 600 may be connected to a main steam turbine 300 via the gearbox 620 after reducing the rotational speed to the grid frequency. According to the example embodiment as illustrated in FIG. 7, the supercritical steam turbine 600 may not require a separate generator. The embodiment of FIG. 7 otherwise corresponds to the embodiment of FIG. 2. Corresponding parts of FIG. 7 are correspondingly numbered, but are not described again with reference to FIG. 7.

According to an aspect, the disclosed embodiments may include a separate supercritical steam turbine 600 and a main steam turbine 300. The separate supercritical steam turbine 600 may be operated at a rotational speed that is much higher than a grid frequency. The rotational speed of the supercritical steam turbine 600 may be reduced to a grid frequency by a gearbox 620.

According to an aspect, the disclosed embodiments may address limitation of a power plant efficiency improvement of a single steam turboset. In a single steam turboset, a supercritical section, a high pressure section, an intermediate pressure, and a low pressure section may be all operated at the same speed at a grid frequency. This may impact plant efficiency improvement due to effects of the supercritical steam. For example, high pressure of the supercritical steam may increase shaft seal leakage losses. High pressure of the supercritical steam may reduce flow volume resulting in low turbine efficiency. The disclosed embodiments comprise a separate supercritical steam turbine and a main turbine. The disclosed embodiments may allow optimizing steam parameters to individual needs of each steam turbine section.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

LIST OF REFERENCES

100 Combined Cycle Power Plant
200 Gas Turbine
220 Gas Turbine Generator
300 Main Steam Turbine
320 Main Steam Turbine Generator
400 Generator
500 Heat Recovery Steam Generator (HRSG)
520 High Pressure (HP) Steam System of the HRSG
522 HP Steam Line
524 Supercritical HP Steam System of the HRSG
526 Subcritical HP Steam System of the HRSG
530 Additional Reheater
540 Intermediate Pressure (IP) Steam System of the HRSG
542 IP Steam Line
544 Cold Reheat Line
546 Reheater
560 Low Pressure (LP) Steam System of the HRSG
562 LP Steam Line
564 Condensate Preheater
570 Condenser
572 Condensate Line
574 Condensate Extraction Pump
576 Boiler Feed Pump
580 Exhaust Stack
600 Supercritical Steam Turbine
610 Supercritical Steam Line
612 Supercritical Steam Flow Control Valve
620 Gearbox
630 Supercritical Steam Turbine Generator
640 Exiting Line of the Supercritical Steam Turbine
650 Supercritical Steam Bypass Line
652 Supercritical Steam Bypass Valve
654 Water Injection Device

What is claimed is:

1. A combined cycle power plant comprising:
a gas turbine that is configured to generate power output;
a heat recovery steam generator located downstream of the gas turbine that is configured to receive exhaust gas from the gas turbines and produce steam by extracting energy from the exhaust gas;
a main steam turbine that is configured to generate power output; and
a supercritical steam turbine that is configured to generate power output,
wherein the heat recovery steam generator comprises multiple pressure steam systems comprising a low pressure steam system, an intermediate pressure steam system, and a high pressure steam system,
wherein the low pressure steam system is configured to generate low pressure steam,
wherein the intermediate pressure steam system is configured to generate intermediate pressure steam,
wherein the high pressure steam system is configured to generate supercritical steam,
wherein the supercritical steam is transferred to the supercritical steam turbine,
wherein the supercritical steam turbine is configured to expand the supercritical steam to generate power output and produce exiting steam,
wherein the main steam turbine is configured to generate power output from the exiting steam from the supercritical steam turbine, the intermediate pressure steam generated in the heat recovery steam generator, and the low pressure steam generated in the heat recovery steam generator, and
wherein the high pressure steam system is configured to further generate subcritical high pressure steam, wherein the subcritical high pressure steam is mixed with the exiting steam from the supercritical steam turbine to generate high pressure steam mixture, and wherein the high pressure steam mixture is transferred to the main steam turbine.

2. The combined cycle power plant as claimed in claim 1, wherein the supercritical steam turbine is configured to be operated at a rotational speed that is higher than a grid frequency.

3. The combined cycle power plant as claimed in claim 2, further comprising a gearbox connected to the supercritical steam turbine, wherein the gearbox is configured to reduce the rotational speed of the supercritical steam turbine to the grid frequency.

4. The combined cycle power plant as claimed in claim 3, further comprising a supercritical steam turbine generator, wherein the supercritical steam turbine is connected to the supercritical steam turbine generator via the gearbox after reducing the rotational speed to the grid frequency.

5. The combined cycle power plant as claimed in claim 3, wherein the supercritical steam turbine is connected to the main steam turbine via the gearbox after reducing the rotational speed to the grid frequency.

6. The combined cycle power plant as claimed in claim 1, wherein the exiting steam from the supercritical steam turbine is reheated in the heat recovery steam generator prior to be transferred to the main steam turbine.

7. The combined cycle power plant as claimed in claim 1, wherein the high pressure steam mixture is reheated in the heat recovery steam generator prior to be transferred to the main steam turbine.

8. The combined cycle power plant as claimed in claim 1, further comprising a supercritical steam bypass line to bypass the supercritical steam turbine during power plant startup or when the supercritical steam turbine is unavailable, wherein the supercritical steam bypass line comprises a supercritical steam bypass valve, and wherein the supercritical steam bypass valve is configured to expand the supercritical steam to produce a high pressure steam that is suitable to the main steam turbine.

9. The combined cycle power plant as claimed in claim 8, further comprising a water injection device arranged in the supercritical steam bypass line downstream of the supercritical steam bypass valve, wherein the water injection device is configured to reduce temperature of the supercritical steam by injecting water to the supercritical steam.

10. A method for operating a combined cycle power plant, wherein the combined cycle power plant comprises a gas turbine, a heat recovery steam generator located downstream of the gas turbine, a main steam turbine, and a supercritical steam turbine, wherein the heat recovery steam generator comprises multiple pressure steam systems comprising a low pressure steam system, an intermediate pressure steam system, and a high pressure steam system, the method comprising:
operating the gas turbine to generate power output;
generating low pressure steam in the low pressure steam system of the heat recovery steam generator by extracting energy from exhaust gas of the gas turbine;

generating intermediate pressure steam in the intermediate pressure steam system of the heat recovery steam generator by extracting energy from the exhaust gas of the gas turbine;

generating supercritical steam in the high pressure steam system of the heat recovery steam generator by extracting energy from the exhaust gas of the gas turbine;

transferring the supercritical steam to the supercritical steam turbine;

expanding the supercritical steam in the supercritical steam turbine to generate power output and producing exiting steam; and operating the main steam turbine to generate power output from the exiting steam from the supercritical steam turbine, the intermediate pressure steam generated in the heat recovery steam generator, and the low pressure steam generated in the heat recovery steam generator, wherein the method further comprising:

generating a subcritical high pressure steam in the high pressure steam system of the heat recovery steam generator, mixing the subcritical high pressure steam with the exiting steam from the supercritical steam turbine to generate a high pressure steam mixture, and transferring the high pressure steam mixture to the main steam turbine.

11. The method as claimed in claim 10, further comprising operating the supercritical steam turbine at a rotational speed that is higher than a grid frequency.

12. The method as claimed in claim 11, further comprising reducing the rotational speed of the supercritical steam turbine to the grid frequency via a gearbox.

13. The method as claimed in claim 12, wherein the supercritical steam turbine is connected to a supercritical steam turbine generator via the gearbox after reducing the rotational speed to the grid frequency.

14. The method as claimed in claim 12, wherein the supercritical steam turbine is connected to the main steam turbine via the gearbox after reducing the rotational speed to the grid frequency.

15. The method as claimed in claim 10, further comprising reheating the exiting steam from the supercritical steam turbine in the heat recovery steam generator prior to transferring to the main steam turbine.

16. The method as claimed in claim 10, further comprising:

reheating the high pressure steam mixture in the heat recovery steam generator, transferring the reheated high pressure steam mixture to the main steam turbine.

17. The method as claimed in claim 10, further comprising bypassing the supercritical steam turbine during power plant startup or when the supercritical steam turbine is unavailable via a supercritical steam bypass line, wherein the supercritical steam is expanded in the supercritical steam bypass line via a supercritical steam bypass valve to produce a high pressure steam that is suitable to the main steam turbine.

18. A combined cycle power plant comprising:

a gas turbine that is configured to generate power output;

a heat recovery steam generators located downstream of the gas turbine that is configured to receive exhaust gas from the gas turbines and produce steam by extracting energy from the exhaust gas;

a main steam turbine that is configured to generate power output;

a supercritical steam turbine that is configured to generate power output, wherein the supercritical steam turbine is configured to be operated at a rotational speed that is higher than a grid frequency; and a gearbox connected to the supercritical steam turbine, wherein the gearbox is configured to reduce the rotational speed of the supercritical steam turbine to the grid frequency, wherein the heat recovery steam generator comprises multiple pressure steam systems comprising a low pressure steam system, an intermediate pressure steam system, and a high pressure steam system, wherein the low pressure steam system is configured to generate low pressure steam, wherein the intermediate pressure steam system is configured to generate intermediate pressure steam, wherein the high pressure steam system is configured to generate supercritical steam, wherein the supercritical steam is transferred to the supercritical steam turbine, wherein the supercritical steam turbine is configured to expand the supercritical steam to generate power output and produce exiting steam, wherein the main steam turbine is configured to generate power output from the exiting steam from the supercritical steam turbine, the intermediate pressure steam generated in the heat recovery steam generator, and the low pressure steam generated in the heat recovery steam generator, and wherein the high pressure steam system is configured to further generate subcritical high pressure steam, wherein the subcritical high pressure steam is mixed with the exiting steam from the supercritical steam turbine to generate high pressure steam mixture, and wherein the high pressure steam mixture is transferred to the main steam turbine.

* * * * *